No. 609,695. Patented Aug. 23, 1898.
J. R. McKEE.
FRUIT PRESS.
(Application filed July 8, 1897.)
(No Model.) 2 Sheets—Sheet 2.

Witnesses
W. F. Allen
Victor J. Evans

Inventor
James R. McKee.
by John Wedderburn
Attorney

UNITED STATES PATENT OFFICE.

JAMES R. McKEE, OF BARDSDALE, CALIFORNIA.

FRUIT-PRESS.

SPECIFICATION forming part of Letters Patent No. 609,695, dated August 23, 1898.

Application filed July 8, 1897. Serial No. 643,825. (No model.)

*To all whom it may concern:*

Be it known that I, JAMES R. McKEE, of Bardsdale, in the county of Ventura and State of California, have invented certain new and useful Improvements in Fruit-Presses; and I do hereby declare the following to be a full, clear, and exact description of the invention, such as will enable others skilled in the art to which it appertains to make and use the same.

This invention relates to improvements in fruit-pressers; and the object of the same is to provide an improved construction in which the fruit may be placed and the juice expelled therefrom.

The invention consists in providing a swinging receptacle having a plurality of removable knives positioned therein, said receptacle adapted to receive the fruit to be crushed, in combination with a pressing-block which is adapted to engage the fruit and press the same against the knives for the purpose of cutting the fruit and also forcing the juice therefrom.

The invention also consists in certain other novel details of construction hereinafter more particularly set forth and claimed.

Figure 1:
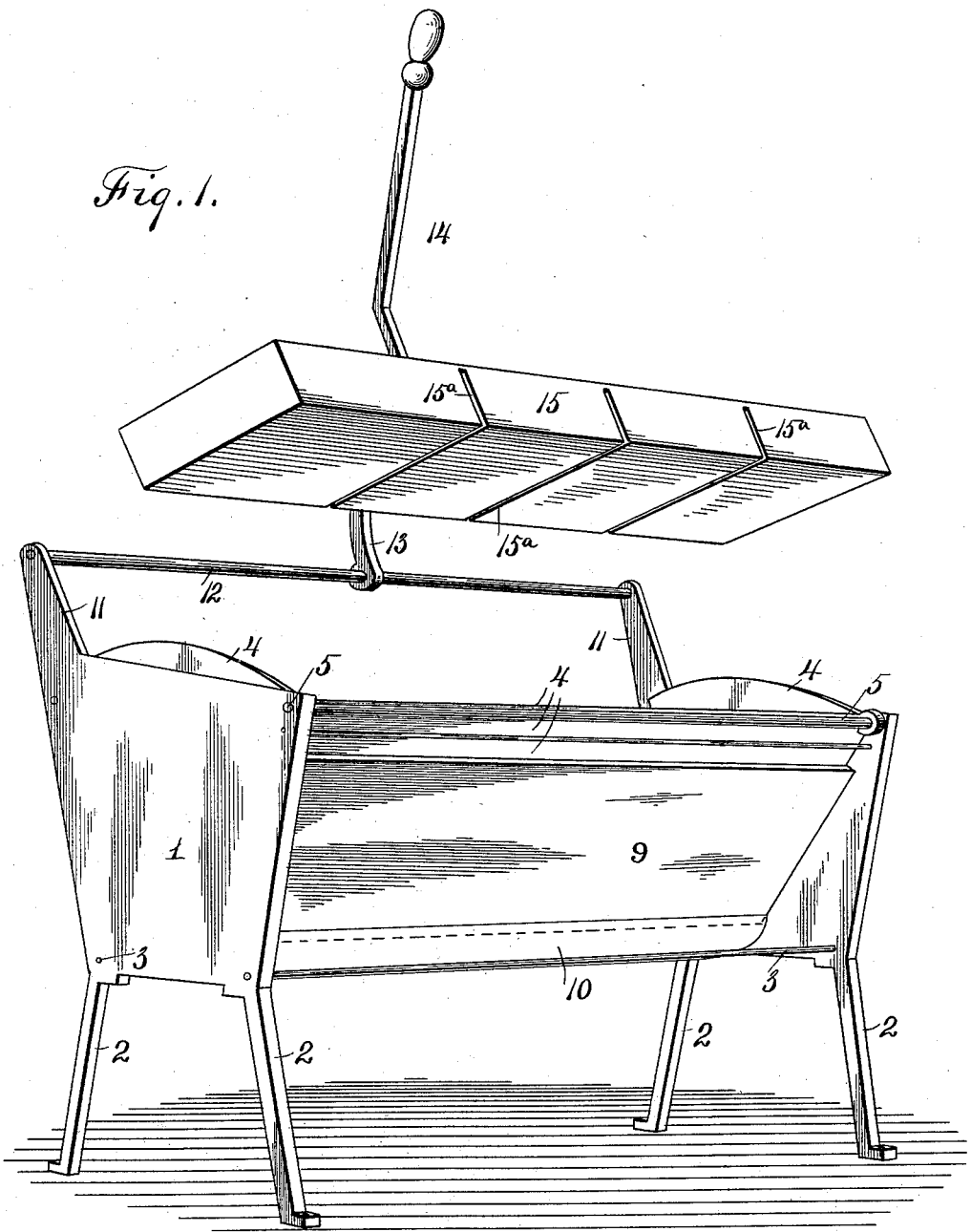
Figure 2:
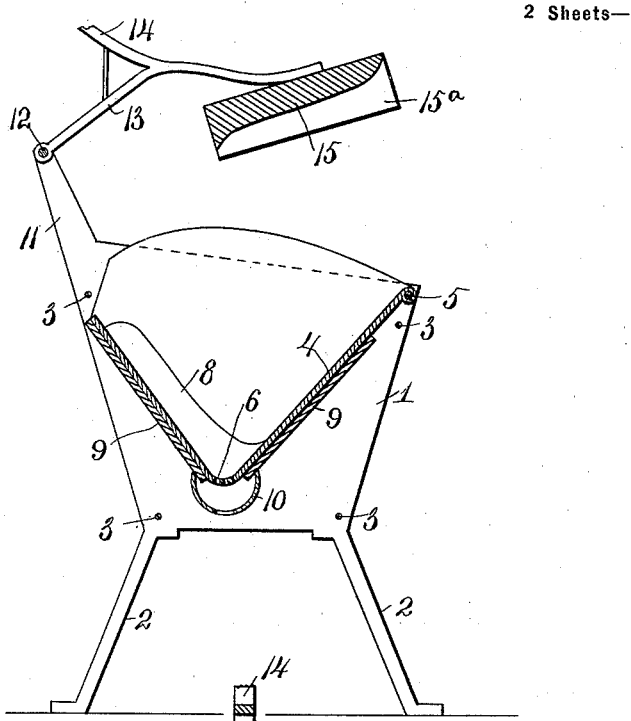
Figure 3:
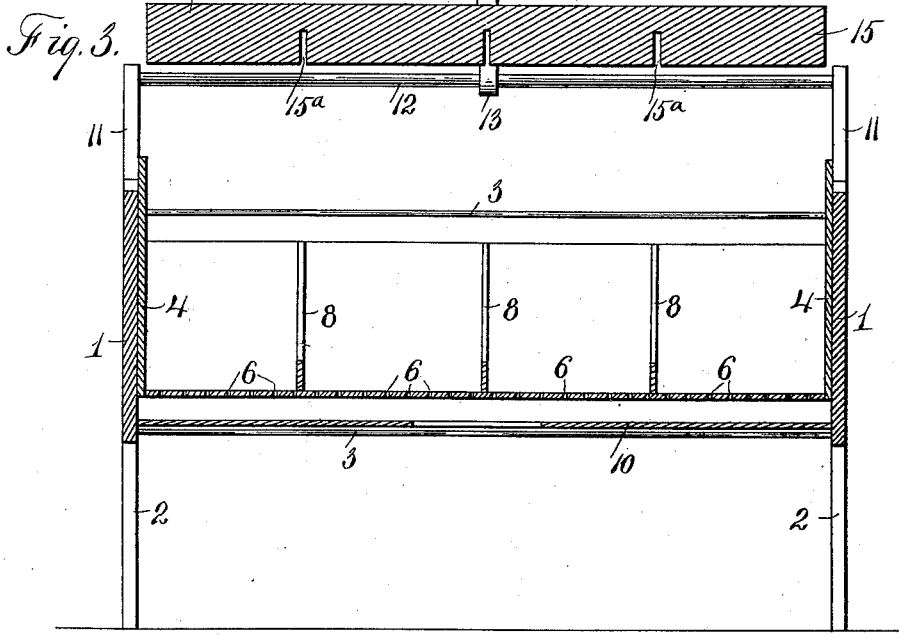

In the accompanying drawings, forming a part of this specification, Figure 1 is a perspective view of my invention, showing the presser-block raised. Fig. 2 is a transverse section, and Fig. 3 is a longitudinal section.

The invention consists in a supporting-frame comprising the end pieces 1, having the legs 2, which may be secured to a supporting-object, said end pieces being connected by the longitudinally-extending rods 3.

4 is a swinging main receptacle which is pivoted upon the rod 5, extending loosely through the pieces at their upper front edges. This receptacle has its side walls inclined downwardly and is provided at its lowest point with a series of perforations 6, through which the juice expelled from the fruit may be passed. Attached to the rear inclined wall of the receptacle is a plurality of knives 8, arranged a suitable distance apart.

The inner sides of the end pieces are recessed, and secured in said recesses are the plates 9, upon which the receptacle is adapted to rest when positioned within the supporting-frame. Secured to the end pieces and extending beneath the swinging receptacle is the trough 10, having a depressed portion provided with an outlet, through which the juice may be passed.

11 indicates the upwardly-disposed arms, which extend from the rear upper edge of the end pieces and through which the pivotal rod 12 loosely passes. Pivoted upon this rod adjacent its center is the Y-lever 13, having the forwardly-disposed handle portion 14. Secured to the stem of this Y-lever is the presser-block 15, having a plurality of grooves $15^a$ in line with and of the same contour as the knives carried by the main receptacle, so that when the presser-block is moved within said receptacle the knives will be sheathed within the grooves.

The operation of my invention is as follows: The fruit, such as lemons or oranges, are placed whole within the main receptacle and the presser-block moved downwardly, causing the knives to engage and cut the fruit and the juice to be expelled therefrom by the engagement therewith of the presser-block, said juice passing through the perforations in the bottom of the receptacle and into the trough therefor, the pulp and seeds remaining in the receptacle to be removed therefrom by swinging the said receptacle from the supporting-body. Should it not be desired to cut the fruit, the knives may be removed and the device operated without the same.

I do not wish to limit myself to the details of construction herein set forth, but reserve to myself the right to change, modify, or vary such details within the scope of my invention.

Having thus described my invention, what I claim as new, and desire to secure by Letters Patent, is—

A fruit press or squeezer, involving the combination of a frame or support, a fruit receptacle or trough pivotally connected with the frame and provided with a perforated bottom, a supplemental trough or juice-receptacle carried by the main receptacle, a plurality of knives or cutters within the receptacle, a lever pivotally connected with the frame, and a presser-block carried by the lever, said presser-block having grooves to register with the knives, substantially as described.

In testimony whereof I have signed this specification in the presence of two subscribing witnesses.

JAMES R. McKEE.

Witnesses:
L. M. HUSSER,
S. P. FARNSWORTH.